(12) United States Patent
Thirumalai et al.

(10) Patent No.: US 10,123,045 B2
(45) Date of Patent: Nov. 6, 2018

(54) MODIFICATION TO BLOCK SIZE FOR TRANSFORM MODE IN DISPLAY STREAM COMPRESSION

(71) Applicant: QUALCOMM Incorporated, San Diego, CA (US)

(72) Inventors: Vijayaraghavan Thirumalai, San Diego, CA (US); Natan Haim Jacobson, San Diego, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 15/213,966

(22) Filed: Jul. 19, 2016

(65) Prior Publication Data
US 2017/0026663 A1    Jan. 26, 2017

Related U.S. Application Data

(60) Provisional application No. 62/196,742, filed on Jul. 24, 2015, provisional application No. 62/220,039, filed on Sep. 17, 2015.

(51) Int. Cl.
*H04N 19/167* (2014.01)
*H04N 19/176* (2014.01)
(Continued)

(52) U.S. Cl.
CPC ........... *H04N 19/60* (2014.11); *H04N 19/122* (2014.11); *H04N 19/14* (2014.11); *H04N 19/147* (2014.11);
(Continued)

(58) Field of Classification Search
CPC ..................................................... H04N 19/60
See application file for complete search history.

(56) References Cited

U.S. PATENT DOCUMENTS

| | | | | |
|---|---|---|---|---|
| 8,571,092 B2 * | 10/2013 | Kim | ......................... | H04B 1/38 375/219 |
| 8,724,692 B2 * | 5/2014 | Lainema | ................... | H04N 7/32 375/240 |

(Continued)

FOREIGN PATENT DOCUMENTS

| | | |
|---|---|---|
| EP | 2557792 A1 | 2/2013 |
| WO | WO-2011019253 A2 | 2/2011 |
| WO | WO-2015160803 | 10/2015 |

OTHER PUBLICATIONS

International Search Report and Written Opinion—PCT/US2016/043145—ISA/EPO—Oct. 6, 2016.

(Continued)

*Primary Examiner* — Jayanti K Patel
*Assistant Examiner* — Irfan Habib
(74) *Attorney, Agent, or Firm* — Shumaker & Sieffert, P.A.

(57) ABSTRACT

Methods and apparatuses for modification to block size for transform mode in display stream compression are disclosed. In one aspect, the method involves selecting a current block and a next block of video data, calculating a first rate-distortion (RD) cost for coding the current and next blocks with a larger block size transform (LBT) mode, and calculating a second RD cost for coding each of the current and next blocks with another coding mode different from the LBT mode. The method may further involve determining whether the first RD cost is less than a sum of the second RD costs for the current and next blocks and coding the current and next blocks with the LBT mode in response to the first RD cost being less than the sum of the second RD costs for the current and next blocks.

30 Claims, 8 Drawing Sheets

(51) Int. Cl.
*H04N 19/60* (2014.01)
*H04N 19/154* (2014.01)
*H04N 19/147* (2014.01)
*H04N 19/122* (2014.01)
*H04N 19/14* (2014.01)

(52) U.S. Cl.
CPC ......... *H04N 19/154* (2014.11); *H04N 19/167* (2014.11); *H04N 19/176* (2014.11)

(56) References Cited

U.S. PATENT DOCUMENTS

| | | | | |
|---|---|---|---|---|
| 9,277,233 | B1* | 3/2016 | Kim | H04N 19/91 |
| 9,497,472 | B2* | 11/2016 | Coban | H04N 19/176 |
| 9,706,204 | B2* | 7/2017 | Song | H04N 19/159 |
| 9,749,579 | B2* | 8/2017 | Lim | H04N 7/0125 |
| 9,836,851 | B2* | 12/2017 | Paik | G06T 7/44 |
| 2003/0185439 | A1* | 10/2003 | Malvar | H04N 1/41 382/166 |
| 2006/0133682 | A1* | 6/2006 | Tu | G06F 17/147 382/248 |
| 2009/0297054 | A1* | 12/2009 | Regunathan | H04N 19/00909 382/248 |
| 2011/0243231 | A1* | 10/2011 | Li | H04N 19/00672 375/240.16 |
| 2013/0028326 | A1* | 1/2013 | Moriya | H04N 19/176 375/240.16 |
| 2014/0219331 | A1* | 8/2014 | Pai | H04N 19/00175 375/240.02 |
| 2015/0078435 | A1* | 3/2015 | Taubman | G06T 9/00 375/240.02 |
| 2015/0304668 | A1* | 10/2015 | Jacobson | H04N 19/196 375/240.01 |
| 2015/0381988 | A1* | 12/2015 | Gu | H04N 19/119 375/240.12 |

OTHER PUBLICATIONS

Lee B., et al., "Hierarchical Variable Block Transform", 2. JCT-VC Meeting, Jul. 21, 2010-Jul. 28, 2010, Geneva, Joint Collaborative Team on Video Coding of ISO/IEC JTC1/SC29/WG11 and ITU-T SG.16, URL: http://wftp3.itu.int/av-arch/jctvc-site/, No. JCTVC-B050, Jul. 24, 2010 (Jul. 24, 2010), XP030007630; 9 pages.
McCann K., et al., "High Efficiency Video Coding (HEVC) Test Model 16 (HM 16) Encoder Description," 18. JCT-VC Meeting; Jun. 30, 2014-Sep. 7, 2014; Sapporo; (Joint Collaborative Team on Video Coding of ISO/IEC JTC1/SC29/WG11 and ITU-T SG.16); URL: http://wftp3.itu.int/av-arch/jctvc-site/,, No. JCTVC-R1002, Oct. 14, 2014, XP030116689; 60 pages.
Wien M., "Variable Block-Size Transforms for Hybrid Video Coding", Dissertation Der Rheinisch-Westfaelischen Technischen Hochschule Aachen, Feb. 3, 2004 (Feb. 3, 2004), pp. 1-183, XP002481661, [retrieved on Feb. 3, 2004].
International Preliminary Report on Patentability from corresponding PCT Application Serial No. PCT/US2016/043145 dated Feb. 8, 2018 (11 pp).
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

* cited by examiner

MODIFICATION TO BLOCK SIZE FOR TRANSFORM MODE IN DISPLAY STREAM COMPRESSION

INCORPORATION BY REFERENCE TO PRIORITY APPLICATION(S)

This application claims the benefit of U.S. Provisional Application No. 62/196,742, filed Jul. 24, 2015 and U.S. Provisional Application No. 62/220,039, filed Sep. 17, 2015, each of which is incorporated by reference in its entirety.

TECHNICAL FIELD

This disclosure relates to the field of video coding and compression, and particularly, to video compression for transmission over display links, such as display stream compression.

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices.

The Video Electronics Standards Association (VESA) has developed display stream compression (DSC) as a standard for display link video compression. The display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In one aspect, a method is operable by a video coding circuit for selecting a coding mode from a plurality of coding modes for coding video data and includes selecting a current block and a next block of the video data; calculating a first rate-distortion (RD) cost for coding the current and next blocks with a larger block size transform (LBT) mode; calculating a second RD cost for coding each of the current and next blocks with another coding mode different from the LBT mode; determining whether the first RD cost is less than a sum of the second RD costs for the current and next blocks; and coding the current and next blocks with the LBT mode in response to the first RD cost being less than the sum of the second RD costs for the current and next blocks.

In another aspect, a device for selecting a coding mode from a plurality of coding modes for coding video data includes a memory configured to store video data including a previous block and a current block; and at least one processor circuit coupled to the memory and configured to: select a current block and a next block of the video data; calculate a first rate-distortion (RD) cost for coding the current and next blocks with a larger block size transform (LBT) mode; calculate a second RD cost for coding each of the current and next blocks with another coding mode different from the LBT mode; determine whether the first RD cost is less than a sum of the second RD costs for the current and next blocks; and code the current and next blocks with the LBT mode in response to the first RD cost being less than the sum of the second RD costs for the current and next blocks.

In another aspect, an apparatus includes means for selecting a current block and a next block of the video data; means for calculating a first rate-distortion (RD) cost for coding the current and next blocks with a larger block size transform (LBT) mode; means for calculating a second RD cost for coding each of the current and next blocks with another coding mode different from the LBT mode; means for determining whether the first RD cost is less than a sum of the second RD costs for the current and next blocks; and means for coding the current and next blocks with the LBT mode in response to the first RD cost being less than the sum of the second RD costs for the current and next blocks.

In yet another aspect, a non-transitory computer readable storage medium has stored thereon instructions that, when executed, cause a processor of a device to select a current block and a next block from video data; calculate a first rate-distortion (RD) cost for coding the current and next blocks with a larger block size transform (LBT) mode; calculate a second RD cost for coding each of the current and next blocks with another coding mode different from the LBT mode; determine whether the first RD cost is less than a sum of the second RD costs for the current and next blocks; and code the current and next blocks with the LBT mode in response to the first RD cost being less than the sum of the second RD costs for the current and next blocks.

DETAILED DESCRIPTION

Figure 1A:
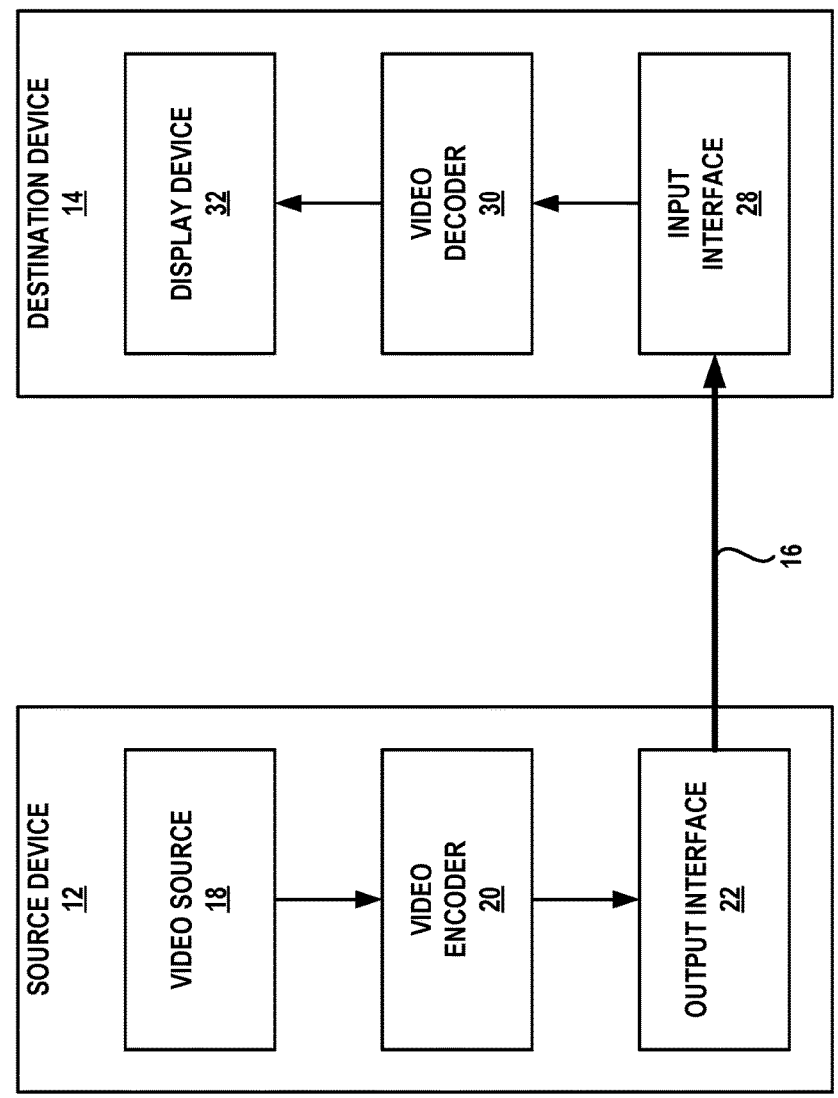
FIG. 1A is a block diagram illustrating an example video encoding and decoding system that may utilize techniques in accordance with aspects described in this disclosure.

In general, this disclosure relates to methods of improving video compression techniques such as, for example, Display Stream Compression (DSC). More specifically, the present disclosure relates to systems and methods for improving the updating of a quantization parameter (QP) via the selection of an appropriate technique for calculating a QP adjustment value.

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. The techniques described herein may be particularly applicable to standards which incorporate a constant bit rate (CBR) buffer model. Also, the techniques described in this disclosure may become part of standards developed in the future. In other words, the techniques described in this disclosure may be applicable to previously developed video coding standards, video coding standards currently under development, and forthcoming video coding standards.

Video coding methods may calculate a QP value by updating a previously calculated QP value with a QP adjustment value. The QP adjustment value may be calculated based on a difference between a previous block and a current block, e.g., a difference between the bits required to code the previous block and the target number of bits in which to code the current block.

However, the QP adjustment value which is determined by conventional techniques may result in coding inefficiencies or may cause noticeable artifacts under certain circumstances. For example, conventional techniques for determining the QP adjustment value may not be aggressive enough for transitions from flat to complex regions of an image (e.g., the QP adjustment value may be less than a more desirable QP adjustment value which would result in better coding efficiency without noticeable artifacts). The concepts of flat and complex regions will be described in greater detail below.

Additionally, when the fullness of the buffer is within a threshold value of being empty or full, the conventional techniques for calculating the QP adjustment value may be too aggressive, resulting in artifacts in an image reconstructed by a decoder. For example, a QP adjustment value calculated by the conventional techniques may be larger than a more desirable QP adjustment value which would mask artifacts from being noticeable in the reconstructed image.

Accordingly, aspects of this disclosure are directed to solving at least the above-indicated problems. In certain aspects, this may be accomplished via the detection or determination of conditions which may be associated with the above-indicated problems, and applying one or more alternative techniques for calculating a QP adjustment value under the detected conditions.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
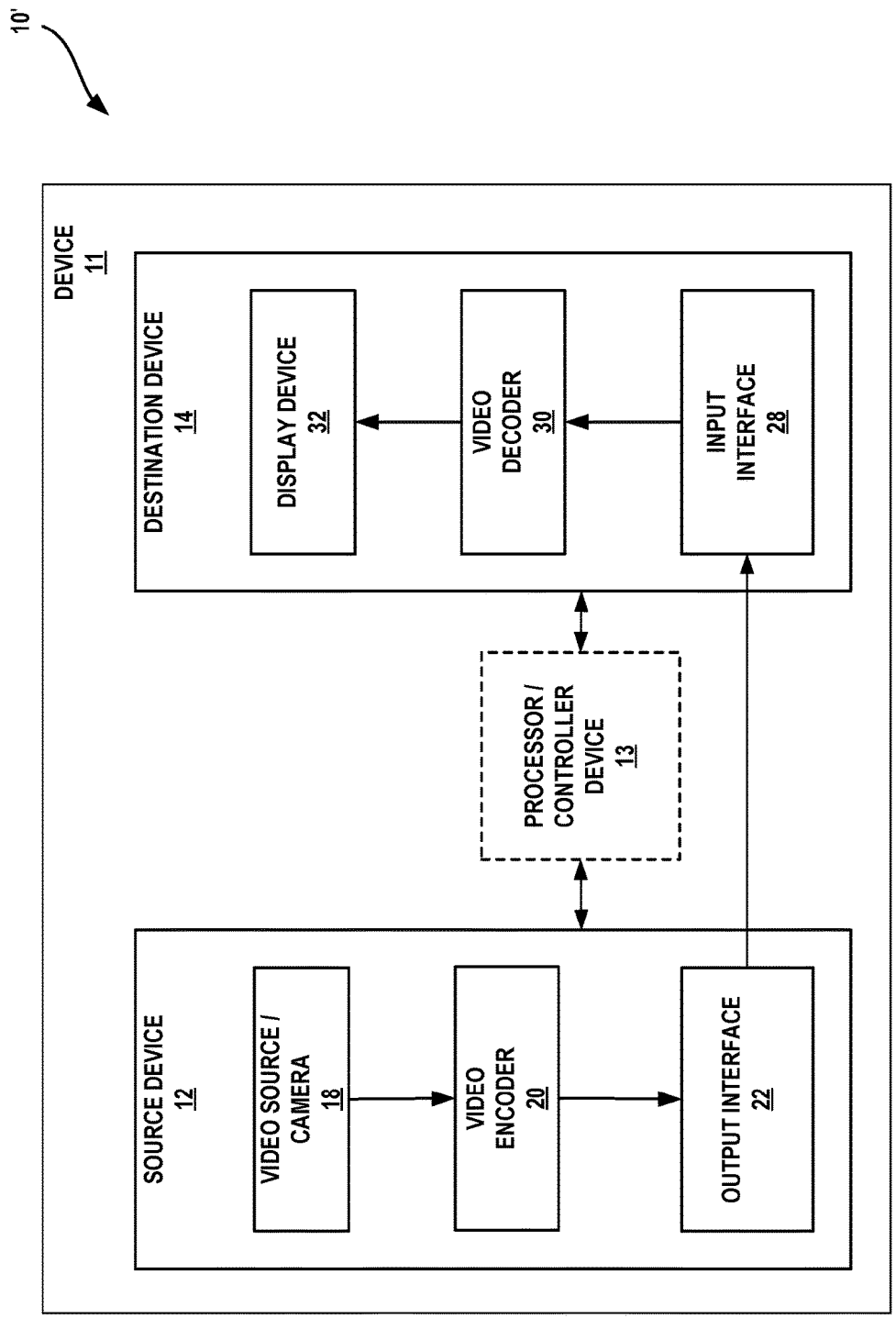
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, video streaming devices, devices that are wearable (or removeably attachable) by (to) an entity (e.g., a human, an animal, and/or another controlled device) such as eyewear and/or a wearable computer, devices or apparatus that can be consumed, ingested, or placed within an entity, and/or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated in FIG. 2B or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a QP. To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or each image or video frame may be encoded in several slices. In DSC, the target bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
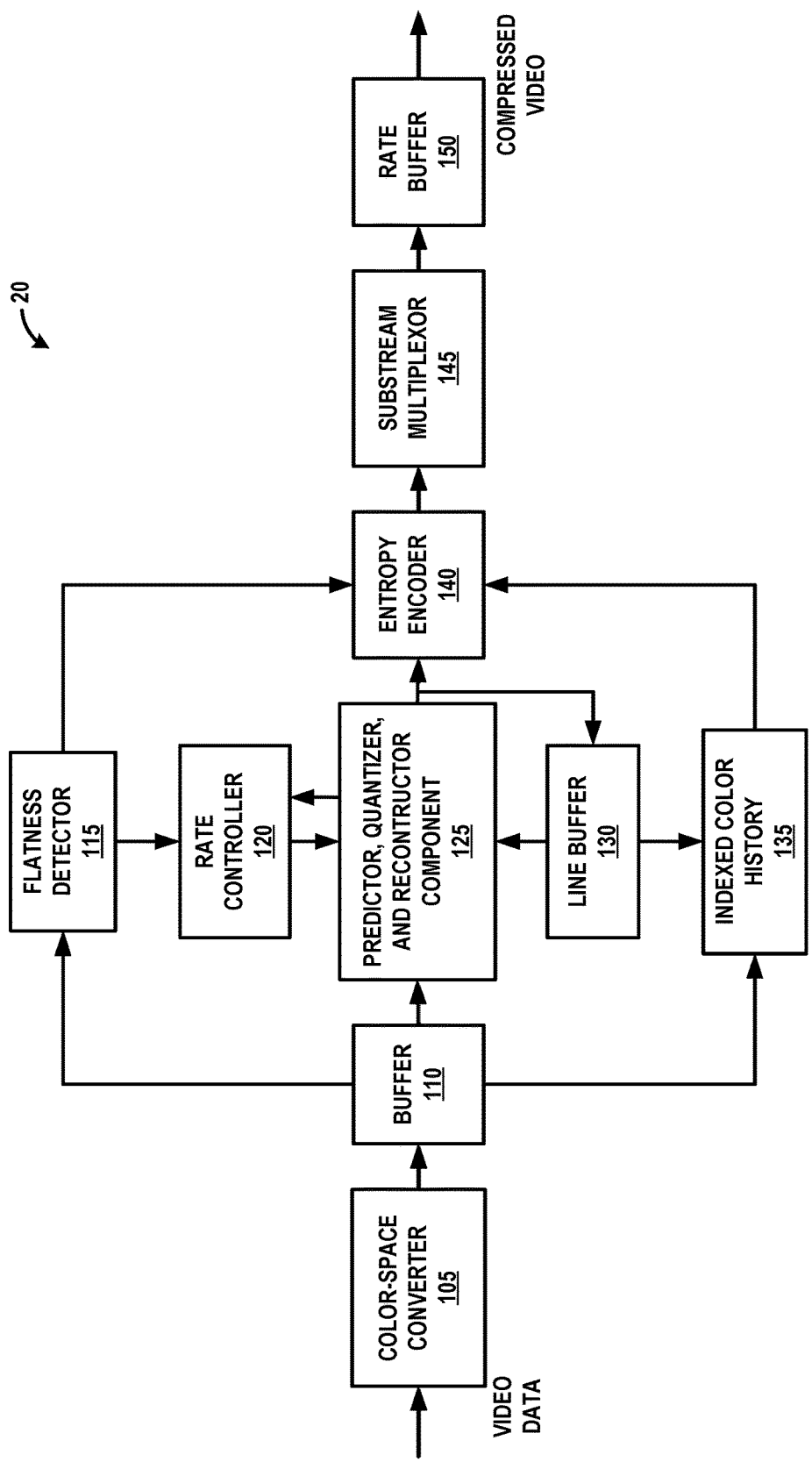
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer, 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space converter 105 may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCgCo) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a CBR buffer model is employed in which bits are taken out from the buffer at a constant bit rate. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the buffer and BufferMaxSize representing the size of the rate buffer 150, i.e., the maximum number of bits that can be stored in the rate buffer 150 at any point in time. The BF may be calculated as:

$$BF=((BufferCurrentSize*100)/BufferMaxSize)$$

It is noted that the above approach to calculating BF is merely exemplary, and that the BF may be calculated in any number of different ways, depending on the particular implementation or context.

The flatness detector 115 can detect changes from complex (i.e., non-flat) areas in the video data to flat (i.e., simple or uniform) areas in the video data, and/or vice versa. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. The term flat as used herein generally describes a region of the video data as being simple for the video encoder 20 to encoder and may, for example, include a smooth gradient in the video data, low spatial frequency, and/or other features which are simple to encode. The transitions from complex to flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified. Similarly, transitions from flat to complex regions may be used by the video encoder 20 to increase the QP in order to reduce the expected rate required to code a current block.

The rate controller 120 determines a set of coding parameters, e.g., a QP. The QP may be adjusted by the rate controller 120 based on the buffer fullness of the rate buffer 150 and image activity of the video data (e.g., a transition from complex to flat regions or vice versa) in order to maximize picture quality for a target bitrate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that it satisfies the bit-rate constraint, i.e., the overall actual coding rate fits within the target bit rate. Thus, one purpose of the rate controller 120 is to determine a set of coding parameters, such as QP(s), coding mode(s), etc., to satisfy instantaneous and average constraints on rate while maximizing rate-distortion performance.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels in the line above or to the left in the same line. In some embodiments, the video encoder 20 and the video decoder 30 may both perform an identical search on reconstructed pixels to determine the block prediction usages, and thus, no bits need to be sent in the block prediction mode. In other embodiments, the video encoder 20 may perform the search and signal block prediction vectors in the bitstream, such that the video decoder 30 need not perform a separate search. A midpoint prediction mode may also be implemented in which samples are predicted using the midpoint of the component range. The midpoint prediction mode may enable bounding of the number of bits required for the compressed video in even the worst-case sample.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
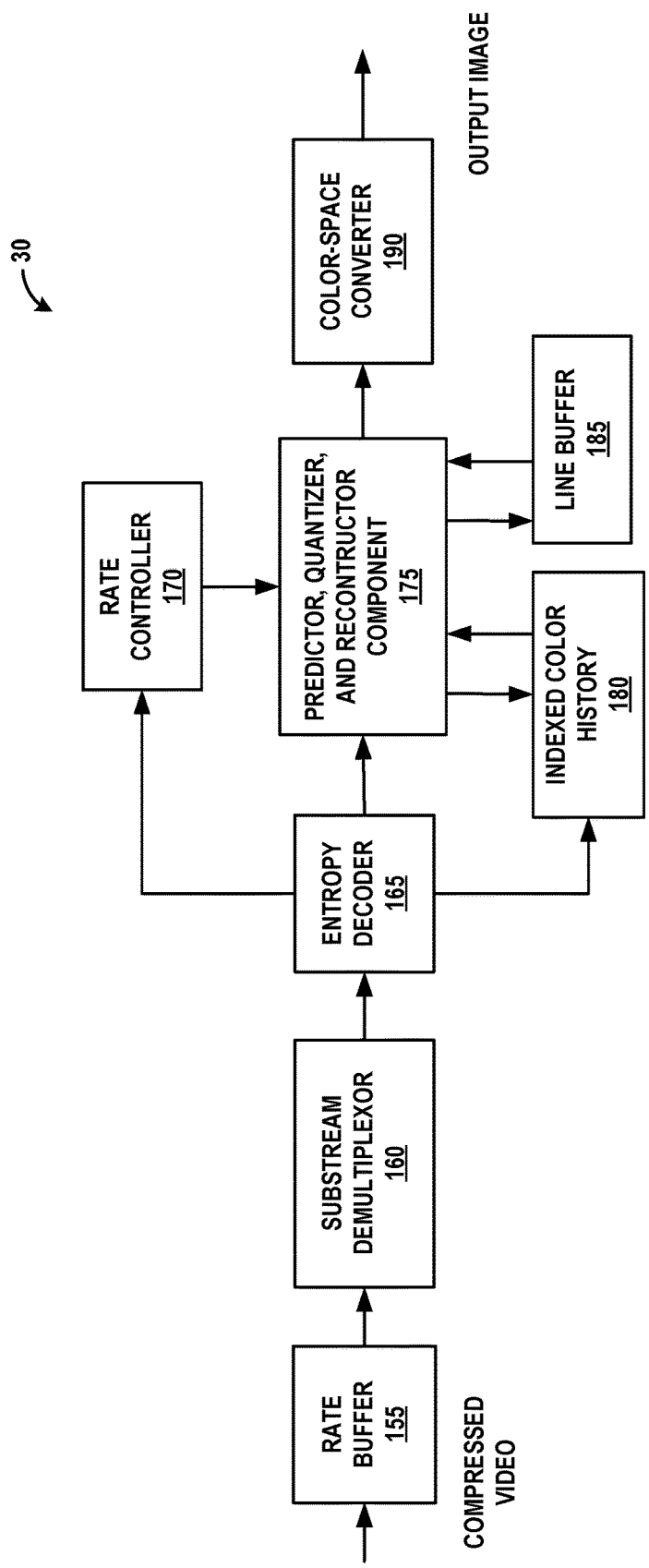
FIG. 2B is a block diagram illustrating an example of a video decoder that may implement techniques in accordance with aspects described in this disclosure.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video decoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

Further Example of DSC Video Encoder

Figure 3:
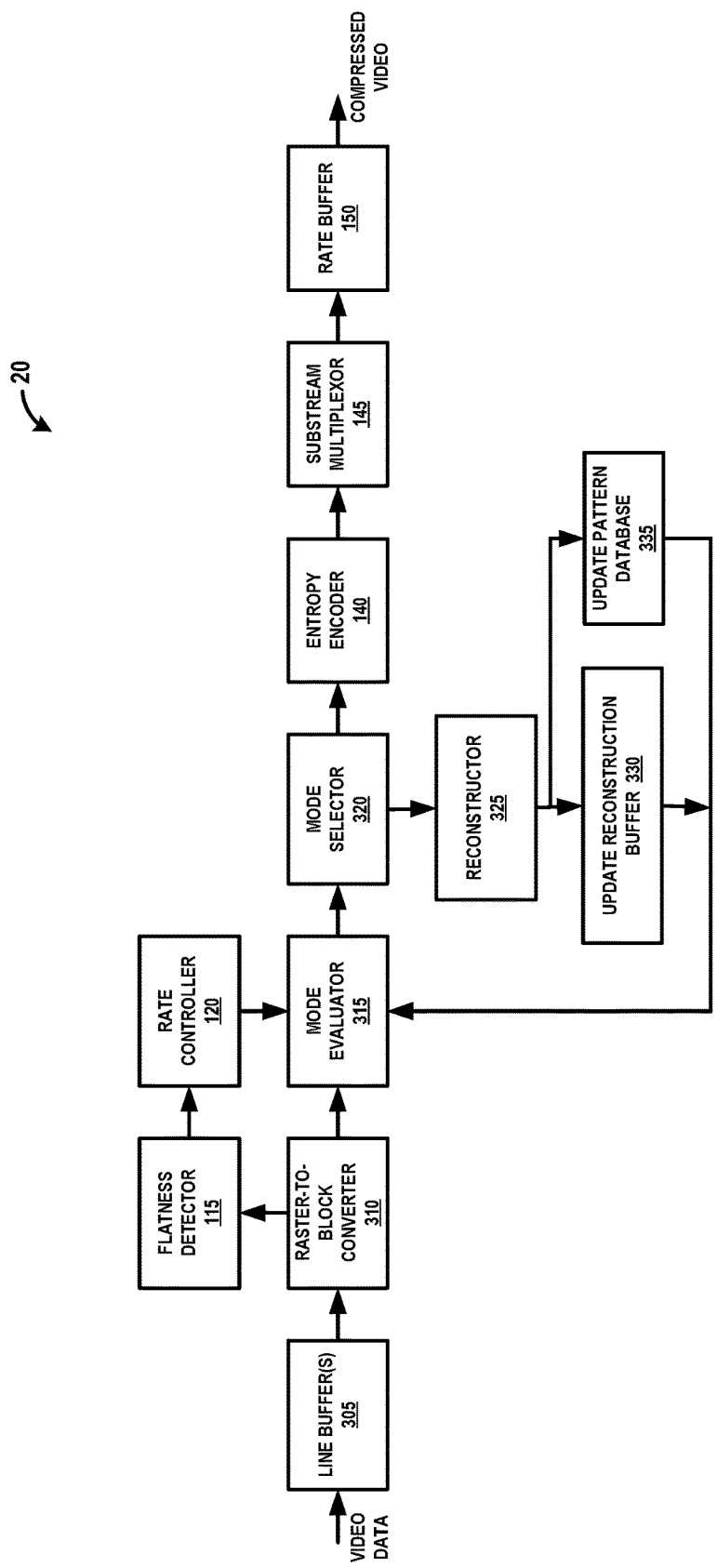
FIG. 3 is a block diagram illustrating another example of a video encoder that may implement techniques in accordance with aspects described in this disclosure.

FIG. 3 is a block diagram illustrating another example of a video encoder 20 with which to implement techniques in accordance with aspects described herein. The video encoder 20, or component(s) thereof, may be configured to perform some or all of the techniques of this disclosure. In some examples, the techniques described herein may be shared or distributed among the various components of the video encoder 20. In some examples, additionally or alternatively, a processor (not shown) may be configured to perform some or all of the techniques described herein.

In the example of FIG. 3, the video encoder 20 includes a plurality of functional components. The functional components of the video encoder 20 may include, for example, a flatness detector 115, a rate controller 120, an entropy encoder 140, a substream multiplexor 145, a rate buffer, 150, line buffer(s) 305, a raster-to-block converter 310, a mode evaluator 315, a mode selector 320, a reconstructor 325, an update reconstruction buffer component 330, and an update pattern database component 335. In other examples, the video encoder 20 may include more, fewer, or different functional components. The flatness detector 115, the rate controller 120, the entropy encoder 140, the substream multiplexor 145, and rate buffer 150 may function similarly to the corresponding components of the video encoder 20 described above in connection with FIG. 2A, and thus, a further detailed discussion of these components will not be repeated.

The line buffer(s) 305 may be a buffer or a plurality of buffers which store, for example, 2-4 lines of video data. The lines of video data stored by the line buffer(s) 305 may be provided to the raster-to-block converter 310. The number of lines stored by the line buffer(s) 305 may correspond to the number of rows of pixels used to create a block of pixels (e.g., K×2 or K×4 blocks). The raster-to-block converter may 310 convert the lines of video data into blocks of video data on which the encoder 20 is designed to operate.

The raster-to-block converter 310 may be configured to provide the blocks to the flatness detector 115 and/or the mode evaluator 315. The flatness detector 115 detects flat areas in the video data, and may operate in a manner similar to the flatness detector 115 of FIG. 2A. Similarly, the rate controller 120, which receives output from the flatness detector 115, may operate in a manner similar to the rate controller 120 of FIG. 2A.

The mode evaluator 315 may be configured to evaluate one or more parameters associated with the coding of the blocks received from the raster-to-block converter 310 in a plurality of coding modes. For example, the mode evaluator 315 may determine a rate-distortion cost for encoding a current block for each of the plurality of coding modes. Examples of the coding modes may include a transform coding mode (e.g., DCT, Hadamard, etc.), a block prediction coding mode, a differential pulse-code modulation (DPCM) coding mode, a pattern coding mode, a mid-point prediction (MPP) coding mode, and an MPP fall back (MPPF) coding mode. The mode selector 320 may select one of the plurality of coding modes for encoding the current block of the video data. In one implementation, the mode selector 320 may be configured to select the coding mode having the lowest rate-distortion cost as determined by the mode evaluator 315. The output of the mode selector 320 may be provided to the reconstructor 325 and/or the entropy encoder 140. Each of the entropy encoder 140, the substream multiplexor, 145 and the rate buffer 150 may operate similarly to the corresponding components of the example encoder described in connection with FIG. 2A.

Similar to the predictor, quantizer, and reconstructor component 125 of the encoder of FIG. 2A, the reconstructor 325 may perform reconstruction of the originally received video data which may include adding an inverse quantized residual to a predicted value and ensuring that the result does not fall outside of an allowed or valid range of sample values. The update reconstruction buffer 330 may be configured to store information related to the reconstruction of the video data from the reconstructor 325. For example, the update reconstruction buffer 330 may store reconstructed pixel values in the same lines as the current block and the previous reconstructed line. In certain implementations, these reconstructed pixel values may be used for prediction in certain coding modes.

The update pattern database 335 may be configured to store pixel values which repeatedly or commonly appear in the video data. These stored pixel values may be used by certain coding modes, such as coding modes which reference an index (e.g., pattern coding mode). The use of one or more indices in the updated pattern database 335 to refer to the stored pixel values may improve rate-distortion for certain content types, such as graphics content, where large regions may include a small set of distinct pixel values.

Although not described or illustrated in detail, those skilled in the art will recognize that a corresponding video decoder may be constructed based on the video encoder 20 illustrated in FIG. 3. Such a video decoder may be configured to decode the encoded video bitstream to reproduce visually lossless images corresponding to the video data received by the video encoder 20.

While certain embodiments of the video encoder and/or video decoder are described herein in the context of the DSC standard, one having ordinary skill in the art would appreciate that systems and methods disclosed herein may be applicable to any suitable video coder or coding standard.

It is noted that the video encoder 20, the video decoder 30, and/or component(s) thereof illustrated in FIGS. 1A-1B, FIGS. 2A-2B, and/or FIG. 3, may be configured to perform one or more of the features of the coding techniques described herein.

The video encoder, the video decoder, and/or component(s) thereof may be implemented on a device that includes an integrated global memory shared by a plurality of programmable compute units that includes a buffer, wherein the buffer may include a first-in-first-out (FIFO) buffer. The device may further include an integrated circuit (IC) that may include at least one processor or processor circuit (e.g., a central processing unit (CPU)) and/or a graphics processing unit (GPU), wherein the GPU may include one or more programmable compute units. The device may be part of a SoC, wherein the SoC that may include a CPU that uses at least one reduced instruction set computing (RISC) instruction set. The SoC may include multiple CPU cores and GPUs.

Block Based Video Coding

Developing display technologies, e.g., high resolution displays such as 4K, may require increasing amounts of data transfer which must be delivered over a display link. In order to cope with future demands, increased compression rates which meet visually lossless requirements, such as a compression target ratios of 4:1 and higher, may be desirable.

As mentioned briefly above, video coding may be performed via a block-based approach. For example, each image to be coded may be divided into a plurality of blocks of pixels, each having a size of P×Q pixels. One example of a block-based video coding standard is DSC in which a coding mode may be individually selected for each bock to be coded. Examples of the coding modes (also referred to as coding options) available in the DSC standard for each block include a transform coding mode (e.g., DCT, Hadamard, etc.), a block prediction coding mode, a differential pulse-code modulation (DPCM) coding mode, a pattern coding mode, a mid-point prediction (MPP) coding mode, and mid-point predication fall back (MPPF) coding mode. A plurality of coding modes may be used by a coder in order to effectively compress different types of contents or images, for example, by selecting a coding mode having a lowest rate-distortion cost. Example techniques for calculating the rate-distortion cost will be described in greater detail below. In one implementation of block-based coding, text images may be more effectively compressed by using a pattern coding mode, while natural images may be more effectively compressed by using a transform coding mode.

A coder may select one of the coding modes from the plurality of coding modes based on rate-control mechanism. The rate-control mechanism may be configured to select the "best" mode for each block by considering both the rate and the distortion of the mode. For example, the "best" mode may be defined as the mode which minimizes a rate-distortion cost for the block. The rate-control mechanism may be supported by a buffer model. Further, in certain implementations, a design requirement for a given codec may include that the buffer is never in a state of underflow (e.g., there are fewer than zero bits in the buffer) or overflow (e.g., the number of bits in the buffer has increased past a set maximum size of the buffer). For example, the encoding/decoding of video data may not be possible when the buffer is in a state of underflow or overflow. In one implementation, in addition to the rate and the distortion, buffer fullness may also be considered when selecting the "best" block.

Transform Coding Mode

In some embodiments, video encoders (such as video encoder 20) may encode video data in a transform coding mode by applying one or more transforms to the pixel values or residual values in order to achieve better compression. For example, an encoder may apply one or more transforms on a block of video data (e.g., pixel values or residual values) and obtain a transform coefficient block (e.g., a block of transform coefficients corresponding to the block of video data). Each transform coefficient may have an associated frequency. As discussed above, after generating a transform coefficient block, the encoder may perform a quantization process on the transform coefficient block, where the transform coefficients are quantized to potentially reduce the amount of data used to represent the transform coefficients, providing further compression.

Similarly, a video decoder (such as video decoder 30) may receive a bitstream generated by the encoder, where the bitstream includes a coded representation of the video data encoded by the encoder. When the decoder receives the bitstream, the decoder parses the bitstream and extracts syntax elements from the bitstream, and may reconstruct the pictures of the video data based on the syntax elements extracted from the bitstream. The process to reconstruct the video data based on the syntax elements may be generally reciprocal to the process performed by the encoder to generate the syntax elements. For example, when a block of the video data was encoded into the bitstream using transform mode, the decoder may inverse quantize the transform coefficient block(s) in the bitstream and perform inverse transforms on the transform coefficient block(s) to reconstruct the block(s) of video data coded in the bitstream.

In some implementations, the encoder may be configured to perform a number of transforms of different sizes (e.g., two different sets of transforms) and select the transform that yields the best performance (e.g., smallest rate-distortion performance among different sets of transform) for a particular block or portion of the image or video data. For example, for P×Q=2×8 block the encoder may perform (i) a single 2×8 transform (8 point transform along horizontal direction and 2 point transform along vertical direction), (ii) two 2×4 transforms (4 point transform along horizontal direction and 2 point transform along vertical direction), where each option utilizes the same number of inputs (e.g., a block of the pixel data).

After performing the various sets of transforms, the encoder may analyze the distortion and the bit rate associated with each option and select one of the options based on the desired performance. The encoder may indicate the selected option to the decoder by signaling a flag or syntax element in the coded bitstream.

Buffer Model

The number of bits spent on encoding each block of an image may vary substantially based on the nature of the block. Therefore, a buffer (e.g., rate buffer 150) may be used a part of the rate control mechanism to smooth the rate variations in the output bit stream. In the constant bit rate (CBR) buffer model, the transmission link takes bits out of the rate buffer 150 at a constant bit rate. In this buffer model, when the encoder 20 frequently adds a greater number of bits than the bits taken out from the buffer, the buffer will overflow. On the other hand, the encoder must add a sufficient number of bits in order to prevent underflow. On the decoder side, the bits are added to the buffer at a constant bit rate and the decoder takes out variable number of bits for decoding each block. To ensure proper decoding, the buffer should not "underflow" or "overflow" at any point during the decoding of the compressed bitstream.

Rate-Distortion (RD) Cost

As described above, the coding mode for a given block may be selected based on the rate-distortion cost for each of the coding modes that can be used to encode the bock. In one embodiment, D may represent the distortion associated with a particular coding mode for the block and R may be the corresponding bit rate for coding the block with the particular coding mode. A cost may be calculated for each mode by considering both the rate and the distortion, according to the equation:

$$Cost=D+\lambda R.$$

Here, λ refers to the Lagrangian multiplier (also referred to as a Lagrangian parameter) that balances the distortion and the rate. In certain embodiments, the cost may be calculated for a plurality of coding modes for a block, and a coding mode having the lowest cost among the calculated rate-distortion costs may be selected to code the block.

Modification of Block Size for Transform Coding Mode

A codec that includes the plurality of coding modes as described above may be capable of compressing content with visually lossless performance. However, for relatively large compression ratios, e.g., compression ratios of 4:1 and greater, visually lossless performance may be difficult to attain for patterns of video data that include high frequency or highly textured content. One measurement of the frequency or texture of video data is a "complexity" measure of the video data. In some embodiments, complexity is a measure of the required number of bits to encode a region of video data at a given quality level. Thus, more complex (e.g., higher frequency or textured content) video data may require more bits to code than less complex video data. In this context, it is desirable to provide increased support for a transform coding mode to allow more sparsity in the transform coefficients, which may result in better performance for compression ratios of 4:1 and above.

In accordance with one or more aspects of the present disclosure, an additional coding mode may be introduced which will be referred to hereinafter as a larger block size transform (LBT) coding mode (or simply LBT mode). The LBT mode may be utilized by a fixed-rate coder for compressing high frequency and highly textured content in images. Compared to the transform mode having a size of, e.g., P×Q in the codec discussed above, LBT mode may involve, for example, operating on a larger region of block size P×M, where M>Q.

In general, applying a transform to video data will produce a number of transform coefficients that is proportional to the number of input values (e.g., pixel values or residual values). Accordingly, applying the LBT mode may result in a larger number of output transform coefficients than a smaller traditional transform of a single block. These additional transform coefficient may include transform coefficients having higher associated frequencies than the single block transform. When encoding blocks having higher complexity (e.g., higher spatial frequency), these additional high frequency transform coefficients may be able to more efficiently represent the complex video data, and thus, lower the overall rate-distortion cost associated with the LBT mode compared to other coding modes.

Figure 4:
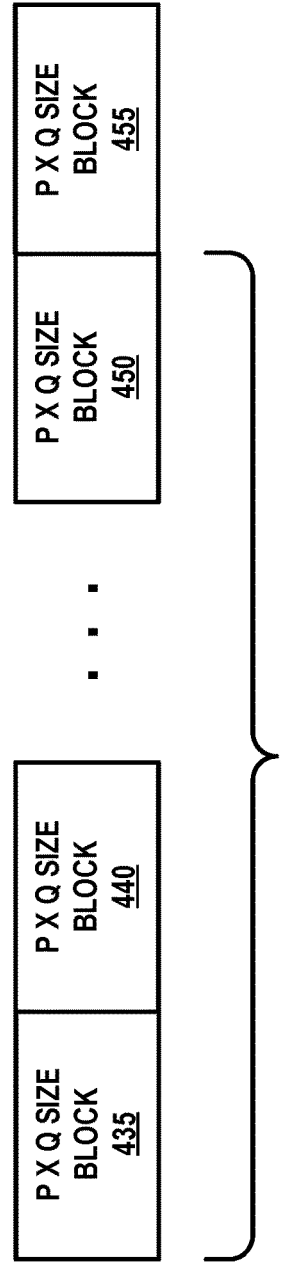
FIG. 4A is a block diagram illustrating an example of a larger block size transform (LBT) mode that may implement techniques in accordance with aspects described in this disclosure.
FIG. 4B is a block diagram illustrating an example of LBT mode that may implement techniques in accordance with aspects described in this disclosure.

Embodiments of LBT mode will now be described in connection with FIGS. 4A and 4B. FIG. 4A is a block diagram illustrating an example of LBT mode that may implement techniques in accordance with aspects described in this disclosure. FIG. 4A illustrates a plurality of blocks 405 to 425, each have a size of P×Q. In LBT mode, a transform may be applied to the samples in the larger block of size P×M, and the coefficients may then be quantized and entropy coded. Examples of transforms that may be applied include wavelet, DCT, Hadamard, etc. In one example, the larger block size may be formed of a plurality of the blocks 405 to 425.

In another example approach to LBT mode, larger blocks sizes, such as O×Q where O>P, or such as O×M, may be utilized. In one implementation, M and O may be integer multiples of Q and P, respectively.

LBT mode may be utilized as a coding mode option in addition to an existing transform mode (which operates on block size P×Q), and/or other coding modes. Transforms used in LBT mode and the existing transform mode (of size P×Q) may vary depending on the context or implementation (e.g., wavelet and DCT, respectively). In one example, the existing transform mode (of size P×Q) may be replaced by the LBT mode.

In yet another example approach, the block size for LBT mode may be fixed. When block size of the LBT is fixed, the LBT mode may be selected or utilized if the corresponding RD cost is strictly less than (or less than and equal to) the cumulative sum of the RD costs corresponding to the optimal coding modes of all blocks of size P×Q, contained in the large block.

In still another example approach, the block size for LBT mode may be adaptively selected by the coder based on content in the images. In other words, the decision to apply LBT mode on a number of consecutive blocks (each block of size P×Q) may be decided "on the fly" (e.g., during processing of the content within the images) by the encoder. With reference to FIG. 4A, when the transform coding mode is found to be (e.g., determined to be) the optimal coding option for a current block 405 or when it is found that block 405 can be effectively compressed using the transform coding mode (the determination may be made based on comparing the RD cost of all modes as described above), or when this determination (e.g., the determination that transform mode is the optimal coding option) is reached based on some other criteria, then the transform may be evaluated for a larger region by including samples in the next block 410, rather coding block 405 separately.

That is, a larger transform may be applied for the samples in blocks 405 and 410 together in LBT mode. When it is found that the samples in blocks 405 and 410 processed together in combination can be effectively compressed by the LBT mode, then the transform may be recomputed by additionally considering the samples in the next block 415, e.g., the LBT coding mode may be applied for samples in blocks 405, 410, and 415 together. This process for selecting a coding mode involves evaluating whether transform mode is optimal for a block and, if so, recomputing the transform for larger block(s). This process may be performed, for example, in an iterative manner, e.g., evaluating whether transform mode is optimal for a first block 405, recomputing the transform for samples in a larger block (e.g., the first block 405 and a second block 410 together), and if it is found that the samples in the first and second blocks 405 and 410 may be effectively compressed by LBT mode then recomputing the transform for samples in an even larger block (e.g., the first and second blocks 405 and 410 in combination with a third block 415), and so on. This process for evaluating whether transform mode is optimal and recomputing the transform for larger blocks may continue until a maximum allowable transform size is reached, or the process may be terminated when it is found not to be beneficial to continue on to larger regions or additional blocks. Afterwards, the identified larger block/region may be coded using LBT mode. In another approach, the current block 405 (size P×Q) may be excluded from the identified large block which may be coded via LBT mode. Instead of coding the current block 405 via LBT mode, the current block 405 may be coded via one of the other modes discussed above. Additionally, as discussed above, a given coding mode may be determined to be "optimal" when the coding mode has the lowest RD cost.

The criteria to extend the transform to the next, additional block, or to select LBT mode for the current larger block, may be decided based on the RD cost. The RD cost associated with all the modes can be compared to the RD cost associated with the LBT mode to decide whether to extend the transform to the next block. For example, the transform mode may be extended to the next block (i.e., extended to additionally include the next block) if the resulting RD cost associated with applying the LBT mode to an even larger block that additionally includes the next block is less than (or less than or equal to) the cumulative sum of the RD costs corresponding to the optimal coding modes of all blocks of size P×Q, contained in the current larger block. In another example, the transform may be extended to the next block if LBT mode RD cost is within a threshold or range of (or approximately equal to) the cumulative sum of the RD costs corresponding to the optimal coding modes of all blocks of size P×Q, contained in the large block.

Figure 5:
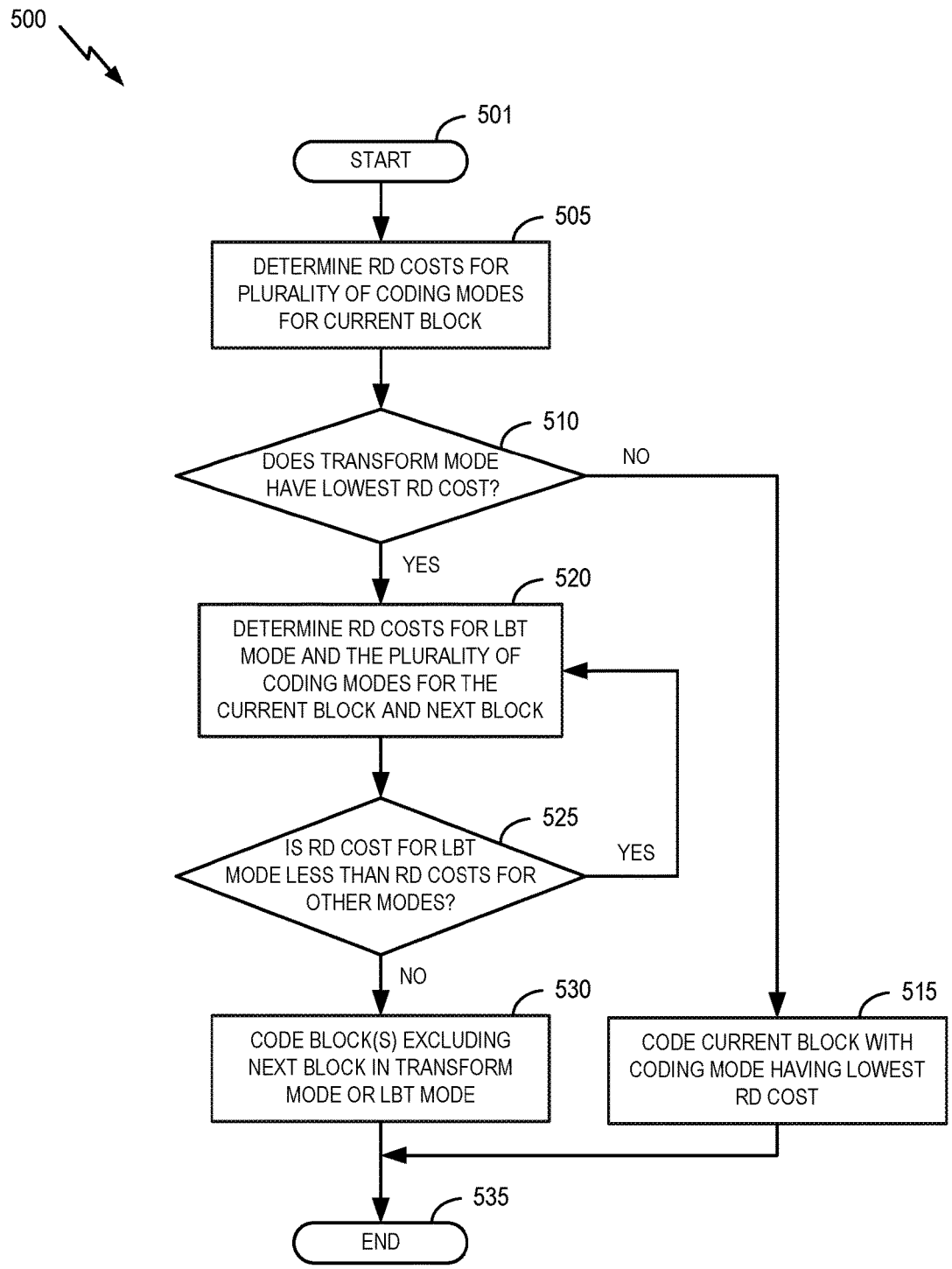
FIG. 5 is a flow chart illustrating an example method of a coding mode which may incorporate LBT mode in accordance with aspects described in this disclosure.

One example of a decision process which may be used to encode larger sized blocks in LBT mode will be described in connection with FIG. 5. FIG. 5 is a flow chart illustrating an example method of a coding mode which may incorporate LBT mode in accordance with aspects described in this disclosure. The method 500 may be performed by a video encoder (e.g., the video encoder 20), a video decoder (e.g., the video decoder 30), or component(s) thereof. For convenience, method 500 is described as performed by a video coder (also simply referred to as coder), which may be the video encoder 20 and/or the video decoder 30, or component(s) thereof.

The method 500 begins at block 501. At block 505, the coder determines the RD costs for a plurality of coding modes for a current block. The plurality of coding modes include a transform coding mode and at least one other coding mode. At block 510, the coder determines whether the RD cost for the transform mode is less than the RD cost(s) for the other (e.g., remaining) coding modes. This determination may be made based on a less than or equal or strictly less than comparison. In other implementations, the coder may determine that the RD cost is not lower than the remaining coding modes, but may still proceed to block 520 when the RD cost for the transform mode is within a threshold difference from the lowest RD cost coding mode.

When the transform mode does not have the lowest RD cost among the modes for which an RD cost has been computed, the method 500 continues at block 515. At block 515, the coder codes the current block using the coding mode having the lowest RD cost as determined in block 505.

When the transform mode has the lowest RD cost, the method continues at block 520. At block 520, the coder determines the RD cost for the LBT mode including the current block and the next block. When returning to block 520 from block 525, the coder determines the RD cost for the LBT mode including the previously determined blocks and a next block (e.g., the coder adds a new next block to the number of blocks for which the LBT has previously been determined). The coder also determines the RD costs for the plurality of modes for the next block. An accumulative RD cost is determined by summing the lowest RD cost for each of the blocks currently under consideration for the corresponding coding modes.

At block 525, the coder determines whether the RD cost for the LBT mode is less than the accumulative RD cost for the combination of the other coding modes. When the RD cost for the LBT mode is less than (or in other embodiments, the comparison may be less than or equal, strictly less than, or within a threshold difference of) the accumulative RD costs for each of the other coding modes, the method 500 returns to block 520 to determine whether the LBT mode including a new next block will have a lower RD cost than an updated accumulative RD cost for the other coding modes. When the cost for the LBT mode is not less than the accumulative RD costs for each of the other coding modes, the method 500 continues at block 530.

At block 530, the coder codes the block(s) excluding the most recently added next block in transform mode or LBT mode. For example, when only the current block has an RD cost less than the other coding modes (e.g., the current and next blocks (2 blocks total) have a greater RD cost than at least one of the other coding modes), the current block is coded in transform mode. When a plurality of blocks (excluding the most recently added next block) have an RD cost in LBT mode that is less than the accumulative RD costs for the other coding modes, these blocks are coded in LBT mode. The method 500 ends at block 535.

In the method 500, one or more of the blocks shown in FIG. 5 may be removed (e.g., not performed) and/or the order in which the method is performed may be switched. In some embodiments, additional blocks may be added to the method 500. The embodiments of the present disclosure are not limited to or by the example shown in FIG. 5, and other variations may be implemented in accordance with the present disclosure.

Returning to FIG. 4B, another example approach of LBT coding is illustrated. FIG. 4B is a block diagram illustrating an example of LBT mode that may implement techniques in accordance with aspects described in this disclosure. FIG. 4B illustrates a plurality of blocks 435 to 455, each having a size of P×Q. In the approach of FIG. 4B, the LBT mode may be selected as the optimal coding mode using the following process. Let $P \times M_{min}$ and $P \times M_{max}$ respectively represent the minimum and maximum allowed LBT transform sizes. The DSC scheme without LBT mode is used first to determine the optimal coding mode for each block of size P×Q, until the total block size reaches $P \times M_{min}$ (e.g., including blocks 435 to 450). With reference to FIG. 4B, there is shown P×Q basic blocks 435 to 455 for a DSC scheme, and $P \times M_{min}$ is a minimum transform size for the LBT mode. Assume that the total number of bits used to code the $P \times M_{min}$ blocks is calculated as $R_{DSC}$ and the corresponding distortion is calculated as $D_{DSC}$. After evaluating the coding performance using the modes in the DSC scheme, the coding performance of LBT mode is evaluated for the previous $P \times M_{min}$ blocks 435 to 450 subject to the constraint that the number of bits that the LBT mode requires is less than or equal to $R_{DSC}$. The distortion of the $P \times M_{min}$ blocks 435 to 450 represented using LBT mode is calculated and may be referred to as $D_{LBT}$. Since the number of bits for both modes are the same or approximately equal, the distortion of the two modes may be compared to make a decision, e.g., if DSC (e.g., coding modes other than LBT mode) is better or LBT mode can be extended to larger block sizes.

If $D_{DSC}$ is much less than the $D_{LBT}$ (e.g., less than $D_{LBT}$ by more than a threshold value), then LBT mode may not be very helpful for this region of size $P \times M_{min}$ (e.g., blocks 435 to 450), and therefore existing DSC coding modes may be used to code this region. Afterwards, the above steps may be repeated, where the coding performance of the next block 455 after the $P \times M_{min}$ blocks 435 to 450 is evaluated using the modes in the existing DSC scheme and using the LBT mode and comparing the distortion to make a decision. This may be performed via a simple alteration to blocks 520 and 525 of FIG. 5 discussed above.

When $D_{DSC}$ is approximately equal to $D_{LBT}$ or $D_{LBT}$ is strictly less than $D_{DSC}$, then it may be determined that it is beneficial to extend the LBT mode further, e.g., to extend LBT mode to include a next block 455. To make this determination, the optimal coding mode of the next block of size $P \times Q$ is first determined from the set of coding modes in the existing DSC. The total rate of the entire block of size $P \times (M_{min}+Q)$ and corresponding distortion are updated, respectively denoted as $R_{DSC}$ and $D_{DSC}$. Then, the coding performance of the LBT mode is determined for the entire region of $P \times (M_{min}+Q)$, subject to the constraint that the number of bits that LBT requires is less than or equal to $R_{DSC}$. If the LBT mode distortion $D_{LBT}$ for the larger block size of $P \times (M_{min}+Q)$ is approximately equal to $D_{DSC}$ or $D_{LBT}$ is strictly less than $D_{DSC}$, then the next block of size $P \times Q$ is included with the current larger block of size $P \times (M_{min}+Q)$ and the distortion of block size of $P \times (M_{min}+2Q)$ are compared, under the assumption that the coding rate of LBT mode is less than or equal to $R_{DSC}$. The process of including an additional block, and comparing the performance of LBT and DSC is continued until a stopping criterion is met. The stopping criterion may be when the total block size of the larger block reaches maximum allowable LBT block size of $P \times M_{max}$ or when the last block in the slice in the same line is hit or when it is found out to be not very useful to continue the LBT mode. The latter case may be determined, for example, when the distortion of the LBT mode is approximately equal to $D_{DSC}$ or when the LBT mode distortion is converging towards $D_{DSC}$.

Once the stopping criterion is met or when it decided that the LBT mode has a lower rate-distortion cost than other DSC coding modes, the reconstructed pixel values of the previous blocks (for which LBT is found to be useful) are replaced with the LBT mode reconstructed values. In one implementation, it may be necessary to replace the bit-stream file with the bits generated using the LBT mode. It may be also necessary, for example, to update or recalculate the QP. After carrying out the necessary changes the above steps may be repeated, where the coding performance of the next larger block of $P \times M_{min}$ is evaluated first using the modes in the existing DSC scheme and then using the LBT mode, and later comparing the distortion to decide to continue with LBT mode or not.

In one implementation, the LBT mode coding performance is not evaluated for a block of size $P \times M_{min}$ when one or more of the following conditions are satisfied for any one of the $P \times Q$ blocks within the block of $P \times M_{min}$: (i) pattern mode is determined to be an optimal coding mode; (ii) a flat block is detected; (iii) a transition from complex to flat region is detected; and (iv) a transition from flat to complex region is detected (then such blocks are not evaluated using LBT mode).

Example Flowchart for Coding in LBT Mode

Figure 6:
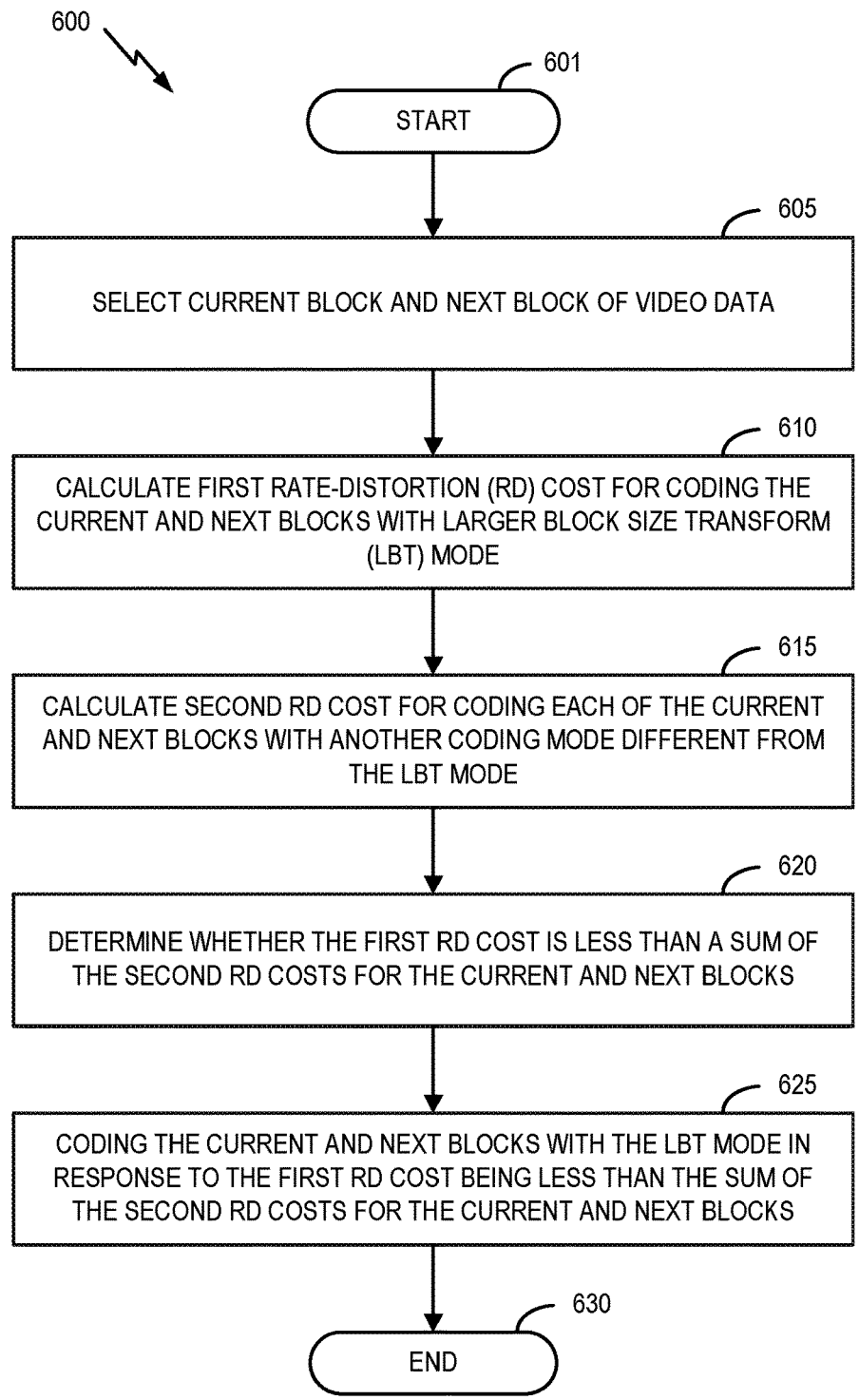
FIG. 6 is a flowchart illustrating a method for implementing LBT mode in accordance with aspects described in this disclosure.

With reference to FIG. 6, an example procedure for coding video data in LBT mode will be described. FIG. 6 is a flowchart illustrating a method 600 for coding video data, according to an embodiment of the present disclosure. The steps illustrated in FIG. 6 may be performed by a video encoder (e.g., the video encoder 20 in FIG. 2A or FIG. 3) or component(s) thereof. For convenience, method 600 is described as performed by a video coder (also simply referred to as coder), which may be the video encoder 20 or another component.

The method 600 begins at block 601. At block 605, the coder selects a current block and a next block of video data to be coded with one or more of a plurality of coding modes. At block 610, the coder calculates a first RD cost for coding the current and next blocks with an LBT mode. At block 615, the coder calculates a second RD cost for coding each of the current and next blocks with another coding mode different from the LBT mode. At block 620, the coder determines whether the first RD cost is less than a sum of the second RD costs for the current and next blocks. At block 625, the coder codes the current and next blocks with the LBT mode in response to the first RD cost being less than the sum of the second RD costs for the current and next blocks.

Although not illustrated, in one alternative implementation, the coder may return from block 620 to 610 in response to the first RD cost being less than the sum of the second RD costs for the current and next blocks. In this implementation, the coder may then calculate an updated first RD cost for coding the current and next blocks along with an additional block with an LBT mode. Blocks 610 to 620 may be repeated in this fashion until the updated first RD cost is not less than the sum of the second RD costs for the current, next, and additional blocks. The method 600 ends at block 630.

In the method 600, one or more of the blocks shown in FIG. 6 may be removed (e.g., not performed) and/or the order in which the method is performed may be switched. In some embodiments, additional blocks may be added to the method 600. The embodiments of the present disclosure are not limited to or by the example shown in FIG. 6, and other variations may be implemented without departing from the spirit of this disclosure.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Processor(s) in communication with (e.g., operating in collaboration with) the computer-readable medium (e.g., memory or other data storage device) may execute instructions of program code, and may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method operable by a video coding circuit for selecting a coding mode from a plurality of coding modes for coding video data, the method comprising:
   selecting a current block and a next block of the video data, wherein the current and next blocks each have a size of P×Q;
   determining whether to evaluate larger block size transform (LBT) mode coding performance based on one or more conditions of a plurality of conditions being satisfied for either of the current or next blocks, wherein the plurality of conditions comprises (i) pattern mode is determined to be an optimal coding mode, (ii) a flat block is detected, (iii) a transition from complex to flat region is detected, and (iv) a transition from flat to complex region is detected;
   in response to determining to evaluate LBT mode coding performance, calculating a first rate-distortion (RD) cost for coding samples in the current and next blocks together with a LBT mode, wherein the LBT mode operates on a LBT size of P×M, wherein M>Q;
   calculating second RD costs for coding each of the current and next blocks individually with a second coding mode different from the LBT mode, wherein calculating the second RD costs comprises calculating, for each of the current and next blocks, a respective second RD cost for coding a respective block individually with the second coding mode;
   determining whether the first RD cost is less than a sum of the second RD costs for the current and next blocks; and
   coding the samples in the current and next blocks with the LBT mode in response to the first RD cost being less than the sum of the second RD costs for the current and next blocks.

2. The method of claim 1, further comprising:
   selecting an additional block of the video data in response to the first RD cost being less than the sum of the second RD costs;
   calculating an updated first RD cost for coding samples in the current, next, and additional blocks together with the LBT mode;
   calculating a third RD cost for coding the additional block with the second coding mode;
   determining whether the updated first RD cost is less than a sum of the second RD costs for the current and next blocks and the third RD cost for the additional block; and
   coding the current, next, and additional blocks with the LBT mode in response to the updated first RD cost being less than the sum of the second RD costs for the current and next blocks and the third RD cost for the additional block.

3. The method of claim 2, further comprising coding the current and next blocks with the LBT mode in response to: i) the first RD cost being less than the sum of the second RD costs for the current and next blocks and ii) the updated first RD cost being not less than the sum of the second RD costs for the current, next, and additional blocks.

4. The method of claim 1, further comprising coding the current block with the second coding mode in response to the first RD cost not being less than the sum of the second RD costs for the current and next blocks.

5. The method of claim 1, wherein calculating the second RD costs for coding each of the current and next blocks with the second coding mode comprises:
calculating a plurality of third RD costs for coding the current block with each of the plurality of coding modes other than the LBT mode;
determining a lowest third RD cost from the calculated third RD costs;
calculating a plurality of fourth RD costs for coding the next block with each of the plurality of coding modes other than the LBT modes; and
determining a lowest fourth RD cost from the calculated fourth RD costs,
wherein the sum of the second RD costs is the sum of the lowest third RD cost and the lowest fourth RD cost.

6. The method of claim 1, further comprising refraining from calculating the first RD cost in response to one or more of the following conditions being satisfied for either of the current or next blocks (i) pattern mode is determined to be an optimal coding mode, (ii) a flat block is detected, (iii) a transition from complex to flat region is detected, and (iv) a transition from flat to complex region is detected.

7. The method of claim 1, further comprising:
calculating a third RD cost for coding a minimum number (Mmin) of blocks starting from the current block with the LBT mode;
calculating a fourth RD cost for coding each of the Mmin blocks with the second coding mode;
determining whether the third RD cost is less than a sum of the fourth RD costs for the Mmin blocks; and
coding the Mmin blocks with the LBT mode in response to the third RD cost being less than the sum of the fourth RD costs for the Mmin blocks.

8. The method of claim 7, further comprising:
selecting an additional block of the video data in response to the third RD cost being less than the sum of the fourth RD costs;
calculating an updated third RD cost for coding the Mmin blocks and the additional block with the LBT mode;
calculating a fourth RD cost for coding the additional block with the second coding mode;
determining whether the updated third RD cost is less than a sum of the fourth RD costs for the Mmin blocks and the additional block; and
coding the Mmin blocks and the additional block with the LBT mode in response to the updated third RD cost being less than the sum of the fourth RD costs for the Mmin blocks and the additional block.

9. The method of claim 8, further comprising:
determining whether adding another additional block to the Mmin blocks and the additional block would reach an LBT block size of greater than Mmax; and
in response to determining that adding another additional block to the Mmin blocks and the additional block would reach an LBT block size of greater than Mmax, refraining from adding the another additional block to the Mmin blocks and the additional block.

10. A device for selecting a coding mode from a plurality of coding modes for coding video data, comprising:
a memory configured to store video data including a previous block and a current block; and
at least one processor circuit coupled to the memory and configured to:
select a current block and a next block of the video data, wherein the current and next blocks each have a size of P×Q;
determine whether to evaluate larger block size transform (LBT) mode coding performance based on one or more conditions of a plurality of conditions being satisfied for either of the current or next blocks, wherein the plurality of conditions comprises (i) pattern mode is determined to be an optimal coding mode, (ii) a flat block is detected, (iii) a transition from complex to flat region is detected, and (iv) a transition from flat to complex region is detected;
in response to determining to evaluate LBT mode coding performance, calculate a first rate-distortion (RD) cost for coding samples in the current and next blocks together with a LBT mode, wherein the LBT mode operates on a LBT size of P×M, wherein M>Q;
calculate second RD costs for coding each of the current and next blocks individually with a second coding mode different from the LBT mode, wherein to calculate the second RD costs, the processor circuit is configured to calculate, for each of the current and next blocks, a respective second RD cost for coding a respective block individually with the second coding mode;
determine whether the first RD cost is less than a sum of the second RD costs for the current and next blocks; and
code the samples in the current and next blocks with the LBT mode in response to the first RD cost being less than the sum of the second RD costs for the current and next blocks.

11. The device of claim 10, wherein the processor circuit is further configured to:
select an additional block of the video data in response to the first RD cost being less than the sum of the second RD costs;
calculate an updated first RD cost for coding samples in the current, next, and additional blocks together with the LBT mode;
calculate a third RD cost for coding the additional block with the second coding mode;
determine whether the updated first RD cost is less than a sum of the second RD costs for the current and next blocks and the third RD cost for the additional block; and
code the current, next, and additional blocks with the LBT mode in response to the updated first RD cost being less than the sum of the second RD costs for the current and next blocks and the third RD cost for the additional block.

12. The device of claim 11, wherein the processor circuit is further configured to code the current and next blocks with the LBT mode in response to: i) the first RD cost being less than the sum of the second RD costs for the current and next blocks and ii) the updated first RD cost being not less than the sum of the second RD costs for the current, next, and additional blocks.

13. The device of claim 10, wherein the processor circuit is further configured to code the current block with the second coding mode in response to the first RD cost not being less than the sum of the second RD costs for the current and next blocks.

14. The device of claim 10, wherein the processor circuit is further configured to:
   calculate a plurality of third RD costs for coding the current block with each of the plurality of coding modes other than the LBT mode;
   determine a lowest third RD cost from the calculated third RD costs;
   calculate a plurality of fourth RD costs for coding the next block with each of the plurality of coding modes other than the LBT modes; and
   determine a lowest fourth RD cost from the calculated fourth RD costs,
   wherein the sum of the second RD costs is the sum of the lowest third RD cost and the lowest fourth RD cost.

15. The device of claim 10, wherein the processor circuit is further configured to refrain from calculating the first RD cost in response to one or more of the following conditions being satisfied for either of the current or next blocks (i) pattern mode is determined to be an optimal coding mode, (ii) a flat block is detected, (iii) a transition from complex to flat region is detected, and (iv) a transition from flat to complex region is detected.

16. The device of claim 10, wherein the processor circuit is further configured to:
   calculate a third RD cost for coding a minimum number (Mmin) of blocks starting from the current block with the LBT mode;
   calculate a fourth RD cost for coding each of the Mmin blocks with the second coding mode;
   determine whether the third RD cost is less than a sum of the fourth RD costs for the Mmin blocks; and
   code the Mmin blocks with the LBT mode in response to the third RD cost being less than the sum of the fourth RD costs for the Mmin blocks.

17. The device of claim 16, wherein the processor circuit is further configured to:
   select an additional block of the video data in response to the third RD cost being less than the sum of the fourth RD costs;
   calculate an updated third RD cost for coding the Mmin blocks and the additional block with the LBT mode;
   calculate a fourth RD cost for coding the additional block with the second coding mode;
   determine whether the updated third RD cost is less than a sum of the fourth RD costs for the Mmin blocks and the additional block; and
   code the Mmin blocks and the additional block with the LBT mode in response to the updated third RD cost being less than the sum of the fourth RD costs for the Mmin blocks and the additional block.

18. An apparatus, comprising:
   means for selecting a current block and a next block of the video data, wherein the current and next blocks each have a size of P×Q;
   means for determining whether to evaluate larger block size transform (LBT) mode coding performance based on one or more conditions of a plurality of conditions being satisfied for either of the current or next blocks, wherein the plurality of conditions comprises (i) pattern mode is determined to be an optimal coding mode, (ii) a flat block is detected, (iii) a transition from complex to flat region is detected, and (iv) a transition from flat to complex region is detected;
   means for calculating a first rate-distortion (RD) cost for coding samples in the current and next blocks together with a LBT mode in response to determining to evaluate LBT mode coding performance, wherein the LBT mode operates on a LBT size of P×M, wherein M>Q;
   means for calculating second RD costs for coding each of the current and next blocks individually with a second coding mode different from the LBT mode, wherein the means for calculating the second RD costs comprises means for calculating, for each of the current and next blocks, a respective second RD cost for coding a respective block individually with the second coding mode;
   means for determining whether the first RD cost is less than a sum of the second RD costs for the current and next blocks; and
   means for coding the samples in the current and next blocks with the LBT mode in response to the first RD cost being less than the sum of the second RD costs for the current and next blocks.

19. The apparatus of claim 18, further comprising:
   means for selecting an additional block of the video data in response to the first RD cost being less than the sum of the second RD costs;
   means for calculating an updated first RD cost for coding samples in the current, next, and additional blocks together with the LBT mode;
   means for calculating a third RD cost for coding the additional block with the second coding mode;
   means for determining whether the updated first RD cost is less than a sum of the second RD costs for the current and next blocks and the third RD cost for the additional block; and
   means for coding the current, next, and additional blocks with the LBT mode in response to the updated first RD cost being less than the sum of the second RD costs for the current and next blocks and the third RD cost for the additional block.

20. The apparatus of claim 19, further comprising means for coding the current and next blocks with the LBT mode in response to: i) the first RD cost being less than the sum of the second RD costs for the current and next blocks and ii) the updated first RD cost being not less than the sum of the second RD costs for the current, next, and additional blocks.

21. The apparatus of claim 18, further comprising means for coding the current block with the second coding mode in response to the first RD cost not being less than the sum of the second RD costs for the current and next blocks.

22. The apparatus of claim 18, further comprising:
   means for calculating a plurality of third RD costs for coding the current block with each of the plurality of coding modes other than the LBT mode;
   means for determining a lowest third RD cost from the calculated third RD costs;
   means for calculating a plurality of fourth RD costs for coding the next block with each of the plurality of coding modes other than the LBT modes; and
   means for determining a lowest fourth RD cost from the calculated fourth RD costs,
   wherein the sum of the second RD costs is the sum of the lowest third RD cost and the lowest fourth RD cost.

23. The apparatus of claim 18, further comprising means for refraining from calculating the first RD cost in response to one or more of the following conditions being satisfied for either of the current or next blocks (i) pattern mode is determined to be an optimal coding mode, (ii) a flat block is detected, (iii) a transition from complex to flat region is detected, and (iv) a transition from flat to complex region is detected.

24. The apparatus of claim 18, further comprising:
means for calculating a third RD cost for coding a minimum number (Mmin) of blocks starting from the current block with the LBT mode;
means for calculating a fourth RD cost for coding each of the Mmin blocks with the second coding mode;
means for determining whether the third RD cost is less than a sum of the fourth RD costs for the Mmin blocks; and
means for coding the Mmin blocks with the LBT mode in response to the third RD cost being less than the sum of the fourth RD costs for the Mmin blocks.

25. The apparatus of claim 24, further comprising:
means for selecting an additional block of the video data in response to the third RD cost being less than the sum of the fourth RD costs;
means for calculating an updated third RD cost for coding the Mmin blocks and the additional block with the LBT mode;
means for calculating a fourth RD cost for coding the additional block with the second coding mode;
means for determining whether the updated third RD cost is less than a sum of the fourth RD costs for the Mmin blocks and the additional block; and
means for coding the Mmin blocks and the additional block with the LBT mode in response to the updated third RD cost being less than the sum of the fourth RD costs for the Mmin blocks and the additional block.

26. A non-transitory computer readable storage medium having stored thereon instructions that, when executed, cause a processor of a device to:
select a current block and a next block from video data, wherein the current and next blocks each have a size of P×Q;
determine whether to evaluate larger block size transform (LBT) mode coding performance based on one or more conditions of a plurality of conditions being satisfied for either of the current or next blocks, wherein the plurality of conditions comprises (i) pattern mode is determined to be an optimal coding mode, (ii) a flat block is detected, (iii) a transition from complex to flat region is detected, and (iv) a transition from flat to complex region is detected;
in response to determining to evaluate LBT mode coding performance, calculate a first rate-distortion (RD) cost for coding samples in the current and next blocks together with a LBT mode, wherein the LBT mode operates on a LBT size of P×M, wherein M>Q;
calculate second RD costs for coding each of the current and next blocks individually with a second coding mode different from the LBT mode, wherein the instructions to calculate the second RD costs comprises instructions to calculate, for each of the current and next blocks, a respective second RD cost for coding a respective block individually with the second coding mode;
determine whether the first RD cost is less than a sum of the second RD costs for the current and next blocks; and
code the samples in the current and next blocks with the LBT mode in response to the first RD cost being less than the sum of the second RD costs for the current and next blocks.

27. The non-transitory computer readable storage medium of claim 26, further having stored thereon instructions that, when executed, cause the processor to:
select an additional block of the video data in response to the first RD cost being less than the sum of the second RD costs;
calculate an updated first RD cost for coding samples in the current, next, and additional blocks together with the LBT mode;
calculate a third RD cost for coding the additional block with the second coding mode;
determine whether the updated first RD cost is less than a sum of the second RD costs for the current and next blocks and the third RD cost for the additional block; and
code the current, next, and additional blocks with the LBT mode in response to the updated first RD cost being less than the sum of the second RD costs for the current and next blocks and the third RD cost for the additional block.

28. The non-transitory computer readable storage medium of claim 27, further having stored thereon instructions that, when executed, cause the processor to code the current and next blocks with the LBT mode in response to: i) the first RD cost being less than the sum of the second RD costs for the current and next blocks and ii) the updated first RD cost being not less than the sum of the second RD costs for the current, next, and additional blocks.

29. The non-transitory computer readable storage medium of claim 26, further having stored thereon instructions that, when executed, cause the processor to code the current block with the second coding mode in response to the first RD cost not being less than the sum of the second RD costs for the current and next blocks.

30. The non-transitory computer readable storage medium of claim 26, further having stored thereon instructions that, when executed, cause the processor to:
calculate a plurality of third RD costs for coding the current block with each of the plurality of coding modes other than the LBT mode;
determine a lowest third RD cost from the calculated third RD costs;
calculate a plurality of fourth RD costs for coding the next block with each of the plurality of coding modes other than the LBT modes; and
determine a lowest fourth RD cost from the calculated fourth RD costs,
wherein the sum of the second RD costs is the sum of the lowest third RD cost and the lowest fourth RD cost.

* * * * *